United States Patent [19]
Ishii et al.

[11] Patent Number: 4,760,387
[45] Date of Patent: Jul. 26, 1988

[54] DISPLAY CONTROLLER

[75] Inventors: Takatoshi Ishii, Tokyo; Makoto Kaneko, Hamamatsu, both of Japan

[73] Assignees: Ascii Corporation, Tokyo; Nippon Gakki Seizo Kabushiki Kaisha, Hamamatsu, both of Japan

[21] Appl. No.: 824,953

[22] Filed: Jan. 31, 1986

[30] Foreign Application Priority Data

Mar. 19, 1985 [JP] Japan .................. 60-55127

[51] Int. Cl.⁴ .............................. G09G 3/00
[52] U.S. Cl. .................... 340/716; 340/717; 340/720
[58] Field of Search ........... 340/703, 716, 718, 717, 340/720, 784, 811, 814; 364/900

[56] References Cited

U.S. PATENT DOCUMENTS

| | | | |
|---|---|---|---|
| 3,559,208 | 2/1967 | Giugno et al. | 340/717 |
| 4,419,661 | 12/1983 | Hetsugi | 340/717 |
| 4,485,463 | 11/1984 | Kita | 340/719 |
| 4,536,856 | 8/1985 | Hiroishi | 364/900 |
| 4,591,842 | 5/1986 | Clarke, Jr. et al. | 340/703 |

FOREIGN PATENT DOCUMENTS 0176834 10/1984 Japan .................. 340/716

*Primary Examiner*—Gerald L. Brigance
*Assistant Examiner*—Mahmoud Fatahi-Yar
*Attorney, Agent, or Firm*—Cushman, Darby & Cushman

[57] ABSTRACT

A display controller displays an image on either of a CRT display unit and a liquid crystal display unit (LCD) having upper and lower screens in accordance with image data stored in a memory. When a CRT display unit is driven, an address generating circuit calculates at the beginning of each horizontal scanning an address of the memory corresponding to the leftmost display position on the current horizontal scanning line in accordance with the vertical position of the horizontal scanning line and the number of display positions on a horizontal scanning line, and stores data representing the address in a first register. The data in the first register is incremented in accordance with the horizontal scanning and fed to the memory to read the image data. When the LCD is driven, the address generating circuit calculates at the beginning of each horizontal scanning two addresses of the memory corresponding respectively to the left most display positions on the current horizontal scanning lines on the upper and lower screens. In this case, the first one is obtained in accordance with the vertical position of the current horizontal scanning line on the upper screen and the number of display positions on a horizontal scanning line, while the second one is obtained by adding the number of display positions on the upper screen to the calculated first address.

6 Claims, 13 Drawing Sheets

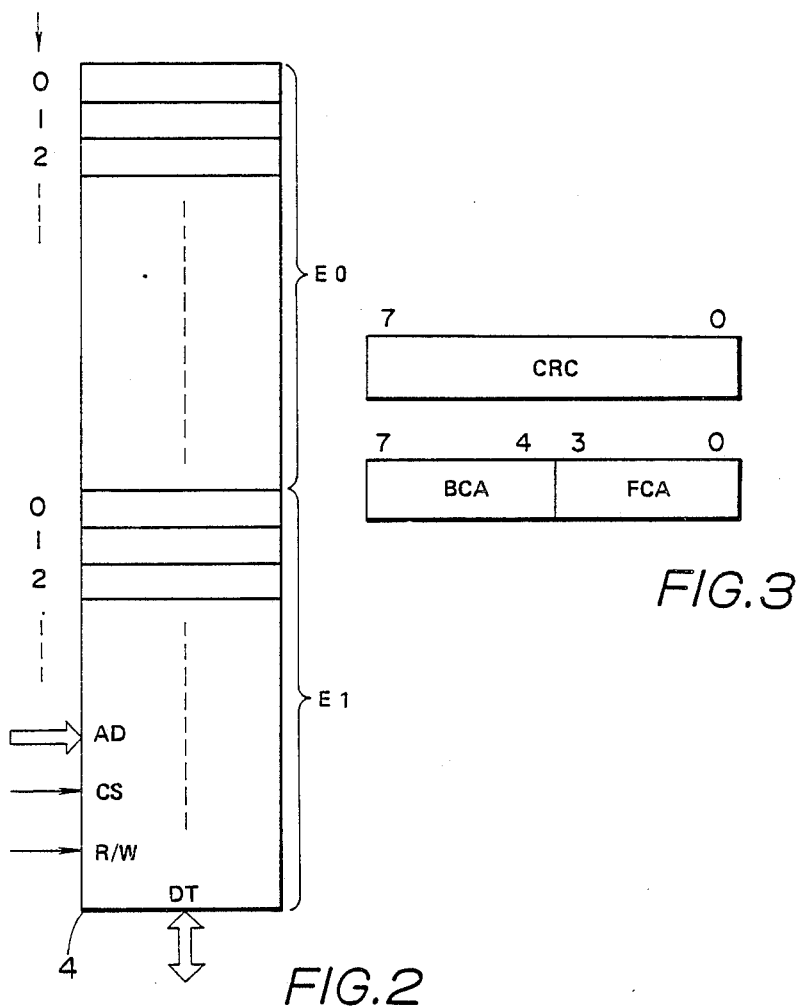

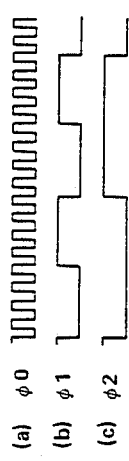
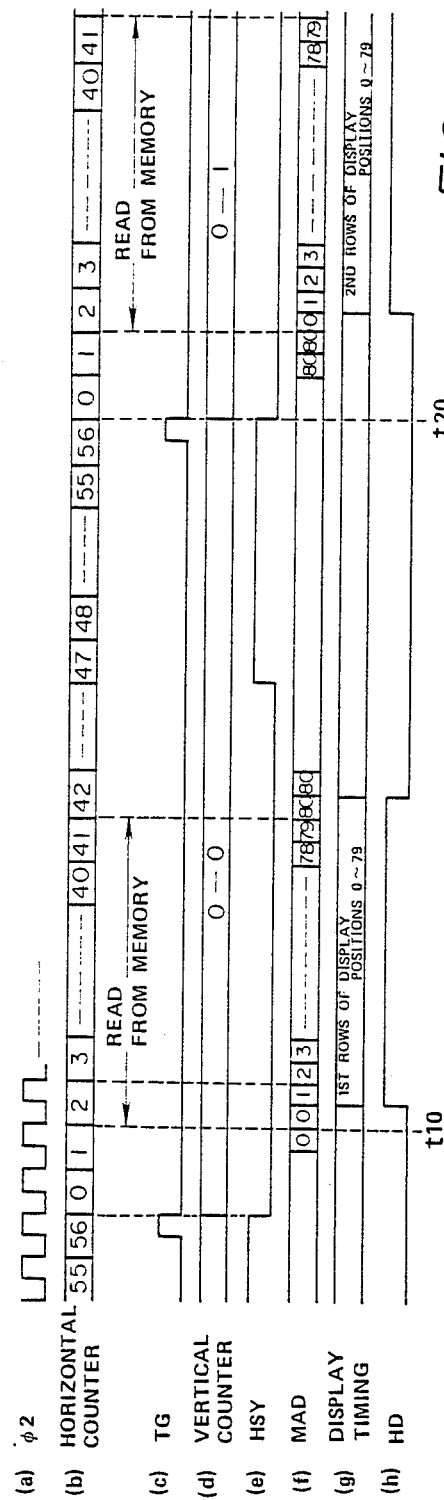
FIG.10
FIG.11

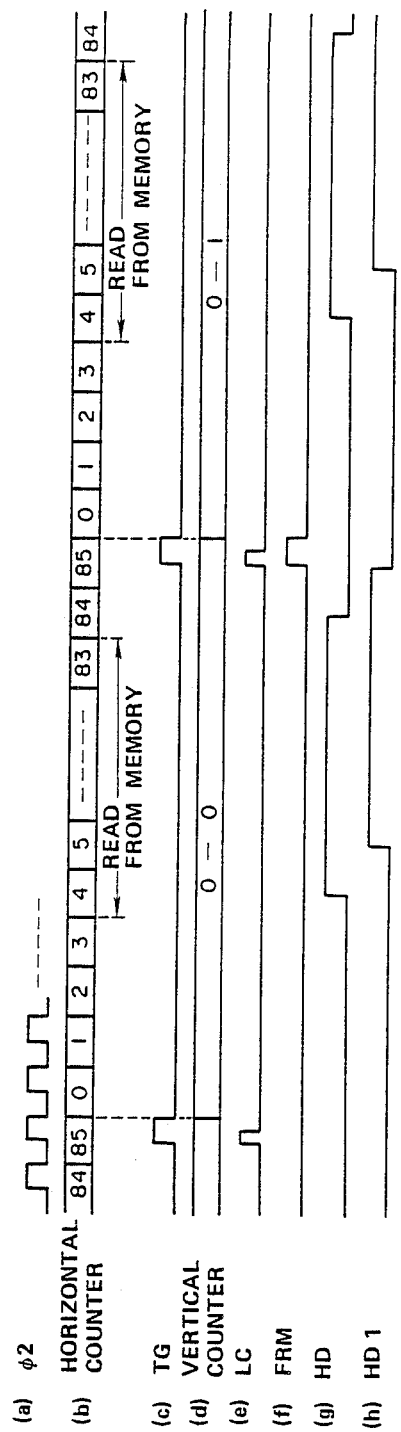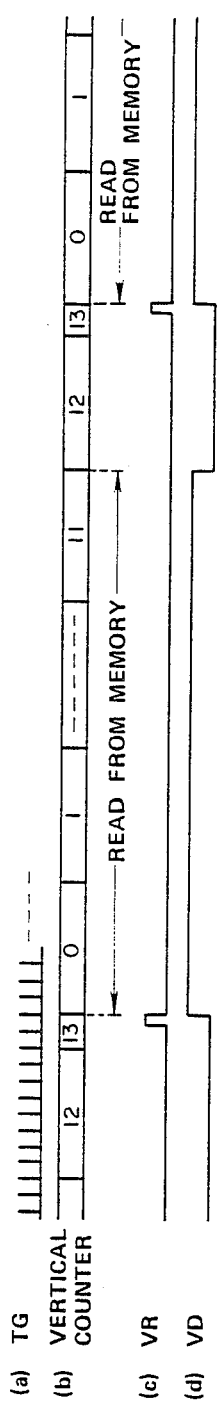
FIG.15
FIG.16

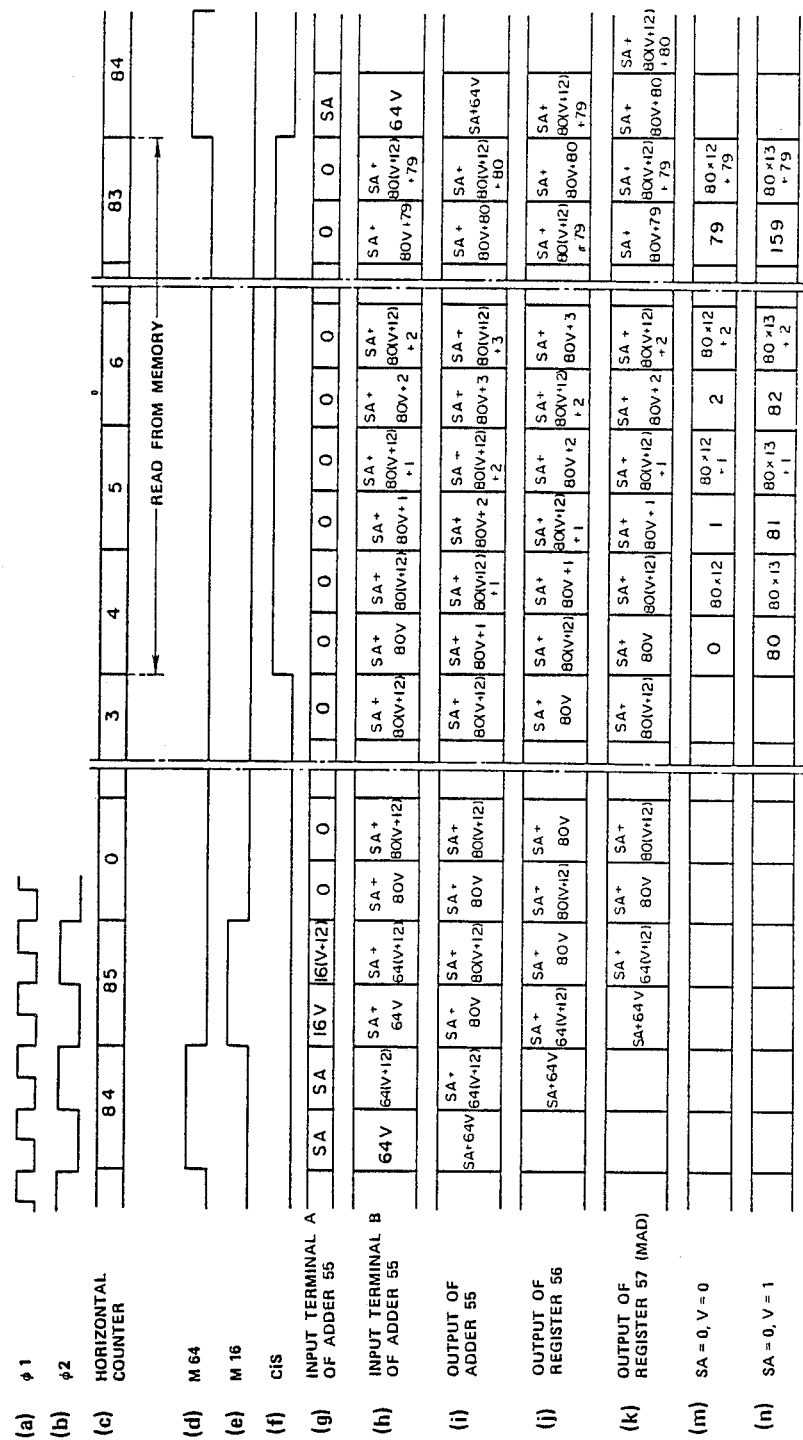

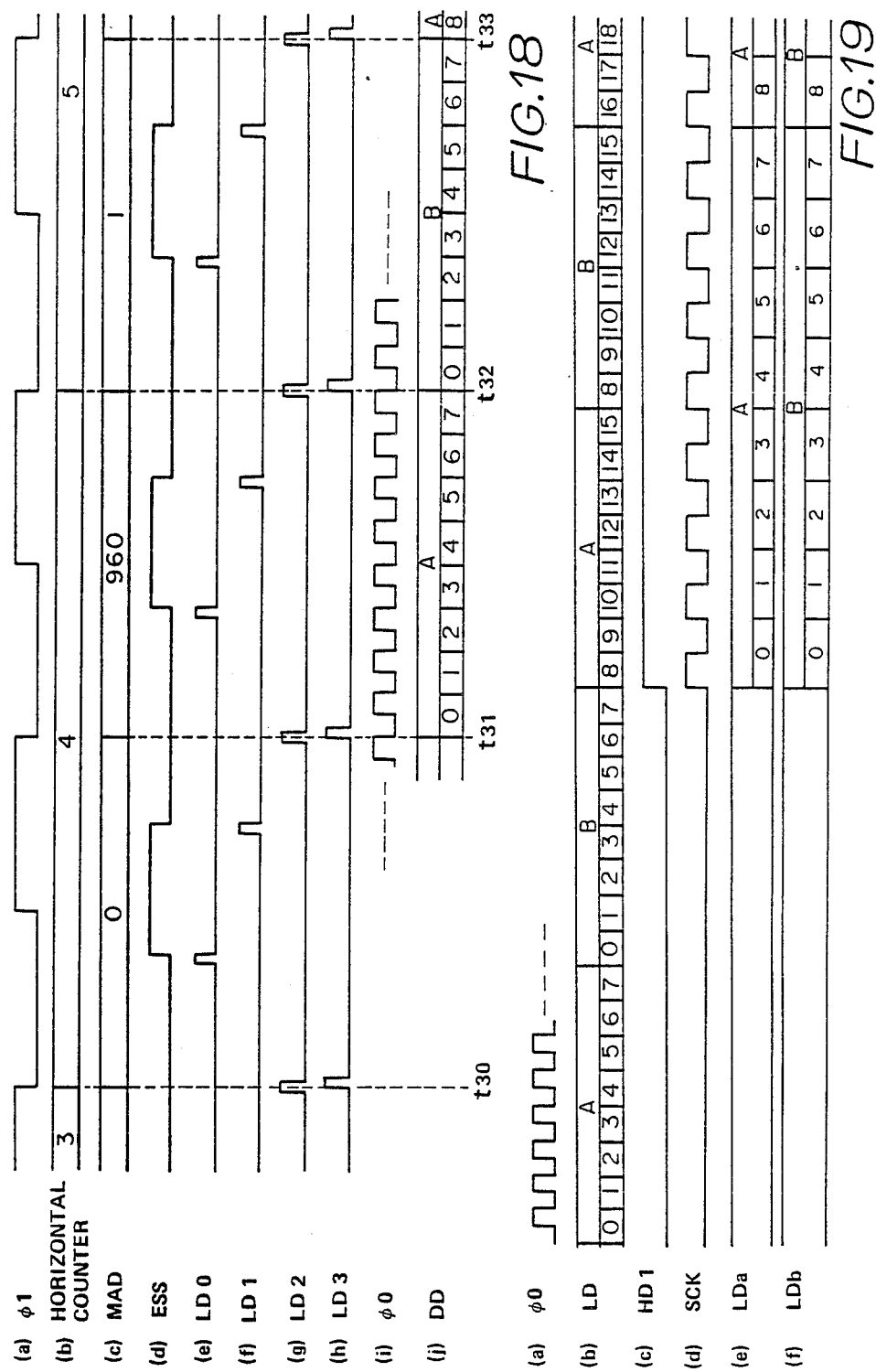

DISPLAY CONTROLLER

BACKGROUND OF THE INVENTION

1. Field of the Invention

This invention relates to a display controller capable of driving either of a CRT display unit or a liquid crystal display unit.

2. Prior Art

A visual display unit is an indispensable terminal device for a computer system such as a personal computer and an office computer. Until recently, CRT (cathode-ray tube) display units were used in most of the computer systems as such terminal devices. However, the recent advance in the liquid crystal display technology have made it possible to use liquid crystal display units as the terminal devices of computer systems particularly of a portable type.

There has been proposed a display controller formed in an LSI device which can drive a display unit in accordance with commands fed from a central processing unit connected thereto. For example, a μPD3301 manufactured by Nippon Electric Co., Ltd. and an HD46505 manufactured by Hitachi, Ltd. can control CRT display units, and a μPD72030G manufactured by Nippon Electric Co., Ltd. and an HD61830 manufactured by Hitachi, Ltd. can control liquid crystal display units.

A commercially available liquid crystal display unit is generally composed of two (upper and lower) screens which are independently driven, while a CRT display unit can be driven as one screen. Thus, a CRT display unit and a liquid crystal display unit must be driven in different manners from each other. Also, the manner of reading data from the video memory for a CRT display unit is different from that for a liquid crystal display unit. For this reason, each of the aforesaid conventional display controllers is designed so as to drive only one of the two kinds of display units. As a result, when it is desired to change the display unit used to another display unit of a different type, not only the display controller but, also the control program therefor must be changed.

SUMMARY OF THE INVENTION

It is therefore an object of the present invention to provide a display controller which can drive either of a CRT display unit and a liquid crystal display unit.

It is another object of the invention to provide a display controller which can be controlled by the same program executed by a central processing unit irrespective of the kind of the display unit connected thereto.

According to an aspect of the present invention, there is provided a display controller comprising a display controller capable of selectively driving one of first and second display units, the first display unit having a display screen comprised of a scanning-type screen which provides M rows of N columns of display positions thereon, the second display unit having a display screen constituted by upper and lower scanning-type screens each of which provides P rows of Q columns of display positions thereon, the display controller being further connected to memory means having a plurality of addresses each for storing display data relating to an image to be displayed in a respective one of the display positions of the selected display unit, the display controller comprising display unit designating means for designating one of the first and second display units, the designation means outputting a first designation signal when the first display unit is selected, and outputting a second designation signal when the second display unit is selected; timing signal generating means responsive to the first designation signal for generating synchronization signals to be supplied to the first display unit for scanning the screen thereof, the timing signal generating means being further responsive to the second designation signal to generate synchronization signals to be supplied to the second display unit for scanning the upper and lower screens thereof; address data generating means responsive to the first designation signal for generating a first series of address data representative of the addresses of the memory means to sequentially output the generated address data to the memory means in accordance with the scanning of the display screen of the first display unit, the address data generating means being further responsive to the second designation signal for generating a second series of address data representative of those of the addresses of the memory means corresponding to the upper screen and a third series of address data representative of those of the addresses of the memory means corresponding to the lower screen, the address data generating means alternately outputting each of the second series of address data and each of the third series of address data to the memory means in accordance with the scannings of the upper and lower screens; and display signal generating means responsive to the first designation signal for generating a first display signal to be supplied to the first display unit based on data read from the memory means in accordance with the first series of address data, the display signal generating means being further responsive to the second designation signal to generate second and third display signals to be supplied to the second display unit based on data read from the memory means in accordance with the second and third series of address data, the second and third display signals being used to display images on the upper and lower screens, respectively.

BRIEF DESCRIPTION OF THE DRAWINGS

FIG. 2 is an illustration showing the video memory 4 of the display system of FIG. 1;

FIG. 3 is an illustration showing data to be written into the video memory 4 of FIG. 2;

FIG. 10 is an illustration showing the waveforms of the clock pulses $\phi_0$ to $\phi_2$;

FIGS. 11 to 14 are timing charts of the various signals appearing in the display controller 1 when the CRT display unit 2 is connected thereto; and FIGS. 15 to 19 are timing charts of the various signals appearing in the display controller 1 when the LCD 3 is connected thereto.

DESCRIPTION OF THE PREFERRED EMBODIMENT OF THE INVENTION

Figure 1:
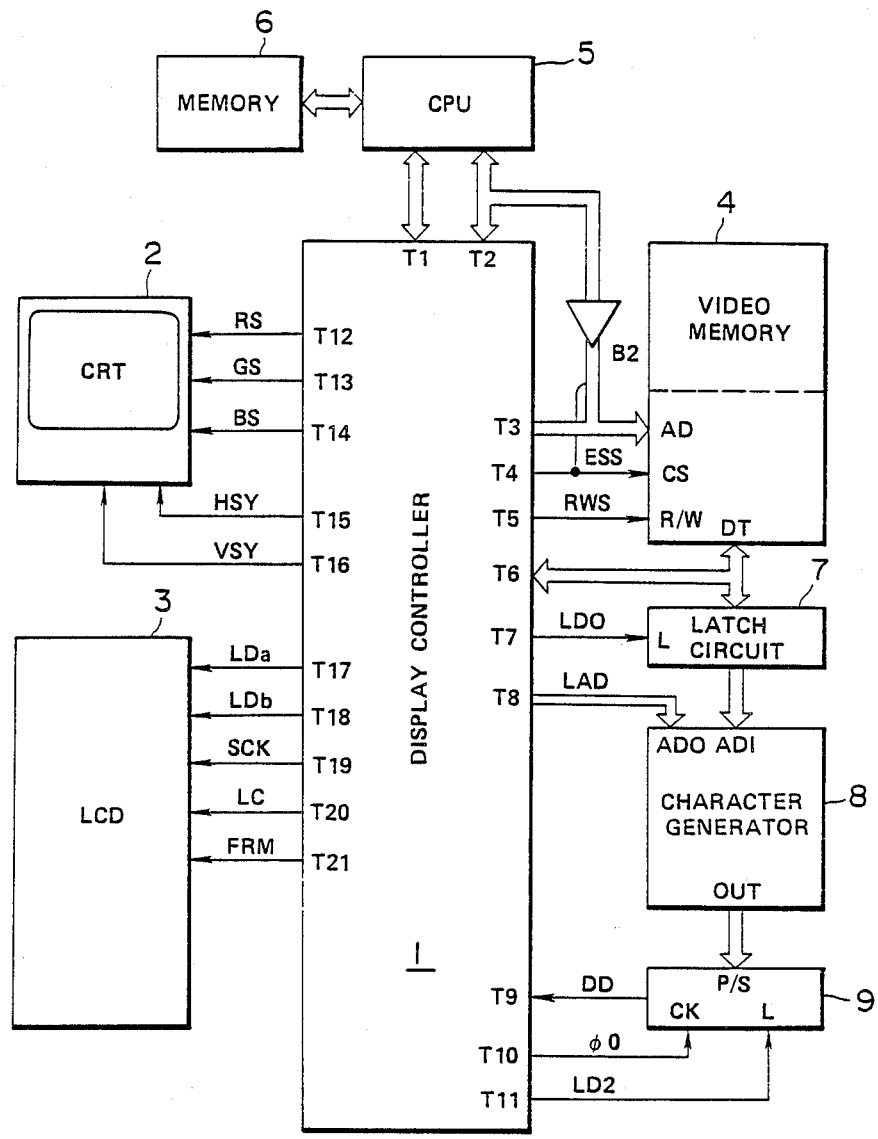
FIG. 1 is a block diagram of a display system in which a display controller 1 provided in accordance with the present invention is used.

FIG. 1 shows the structure of a display system to which a display controller 1 provided in accordance with one embodiment of the invention is applied. The display controller 1 is of a character display type and effects, in accordance with data stored in a video memory 4, display of characters using 640×192 display dots provided on a screen of a CRT display unit 2 or a liquid crystal display unit (hereinafter referred to as "LCD") 3. The display controller 1 drives either of the CRT display unit 2 and the LCD 3, but does not drive both of them at the same time.

The display system shown in FIG. 1 will now be fully described. [1] Structure of each circuit element of the display system of FIG. 1.

Central processing unit 5(CPU) is shown connected to a memory 6 including a ROM for storing programs to be executed by the CPU 5 and a RAM for storing data. The CPU 5 stores display data into the video memory 4 which comprises, as shown in FIG. 2, two areas $E_0$ and $E_1$ of the same storage capacity. The area $E_0$ is selected when a "0" signal is supplied to a terminal CS of the video memory 4, while the area $E_1$ is selected when a "1" signal is supplied to the terminal CS. An address in each of the areas $E_0$ and $E_1$ is designated by an address data supplied to an address terminal AD of the memory 4, and reading and writing of data is performed through a data terminal DT thereof. The memory 4 also comprises a read/write control terminal R/W.

The construction of the video memory 4 and the relation between the addresses of the memory 4 and display positions of characters on the screen will be described. The display data is formed on a two-byte unit basis, and a character to be displayed is represented by two bytes. FIG. 3 shows the two bytes forming a unit of the display data, wherein the first byte contains a character code for designating a character to be displayed and the second byte contains a foreground color code FCA in the lower four bits and a background color code BCA in the higher four bits. In this case, the color code FCA designates a color of the character and the color code BCA designates a color of the background of the character. The character code CRC and the color codes FCA and BCA for a character are stored in the same addresses of the areas $E_0$ and $E_1$. For example, in the case where the character code CRC for a given character is stored in the tenth address of the area $E_0$, the color codes FCA and BCA for the same character are stored in the tenth address of the area $E_1$.

Figure 4:
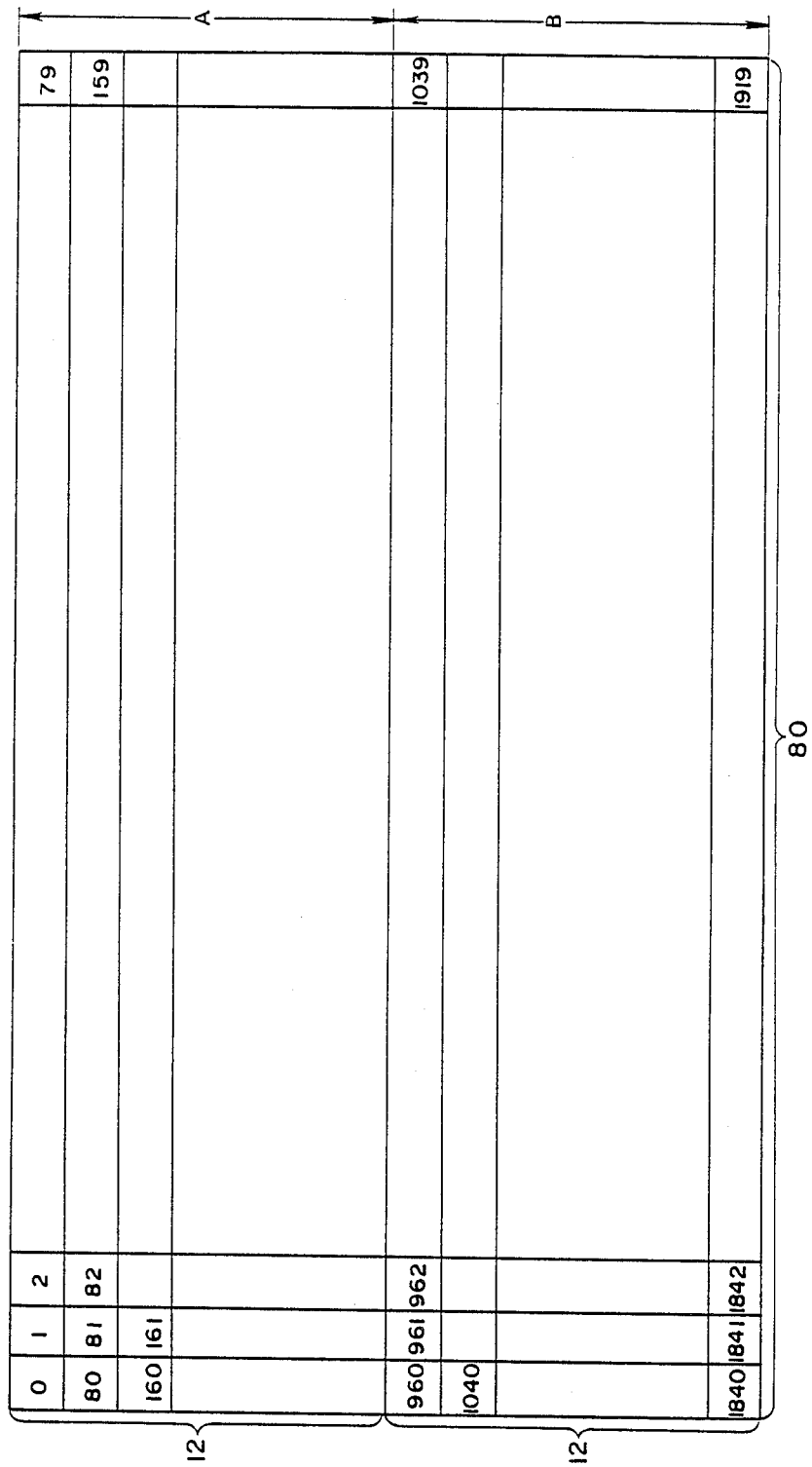
FIG. 4 is an illustration showing the display screen.

The relation between the addresses of the memory 4 and the display positions of characters on the screen will now be described. In this embodiment, a character is displayed on the screen using a 8×8 dot matrix, and the total number of dots on the screen is 640×192. Therefore, up to 80×24 characters can be displayed on the screen at the same time. Assuming that the display screen is divided into display sections each composed of an 8×8 dot-matrix as shown in FIG. 4, each character designated by the corresponding display data in the video memory 4 is displayed in a respective one of the display sections. FIG. 4 shows the display sections of the screen assigned numbers 0 to 1919, which represent corresponding display positions. The character codes representative of the characters to be displayed at the display positions No. 0, No. 1, No. 2, . . . , No. 1919. These positions are stored in consecutive addresses of the area $E_0$ from the lowest one, while the pairs of character codes FCA and BCA corresponding respectively to the character codes CRC are stored in the consecutive addresses of the area $E_1$ from the lowest one. In this case, the start address SA where the code of the character to be displayed at the display position No. 0 is stored may be any address in the area $E_0$. For example, in the case of the start address SA being the 100th address, the codes of the characters to be displayed in the display positions No. 0, No. 1, No. 2, . . . No. 1919 are stored respectively in the 100th address, 101st address, 102nd address, . . . 2019th address.

Referring again to FIG. 1, a character code CRC outputted from the video memory 4 is loaded onto a latch circuit 7, and an output of the latch circuit 7 is supplied to a character generator 8. The character generator 8 comprises a ROM storing character patterns of the characters used in this system, each character pattern being in the form of an 8 row×8 column dot matrix. When a character code CRC is supplied to an address terminal $AD_1$ of the character generator 8, one of the character patterns which corresponds to the supplied character code is selected. One of the rows of the selected character pattern is selected by data LAD supplied to another address terminal $AD_0$ of the character generator 8. An eight-bit pattern of the thus selected row (row pattern) of the character pattern is outputted from an output terminal OUT of the character generator 8. A parallel-to-serial (P/S) converter 9 composed of a shift register stores the row pattern outputted from the character generator 8 when a load signal $LD_2$ is supplied to a load terminal L thereof, and then serially outputs the stored row pattern dot by dot in synchronism with a clock pulse $\phi_0$. The dot data thus outputted from the P/S converter 9 is supplied as data DD to the display controller 1. The CRT display unit 2 can display a color image composed of 640×192 dots in accordance with color signals RS (red), GS (green) and BS (blue), a horizontal synchronization signal HSY and a vertical synchronization signal VSY all supplied from the display controller 1.

Figure 5:
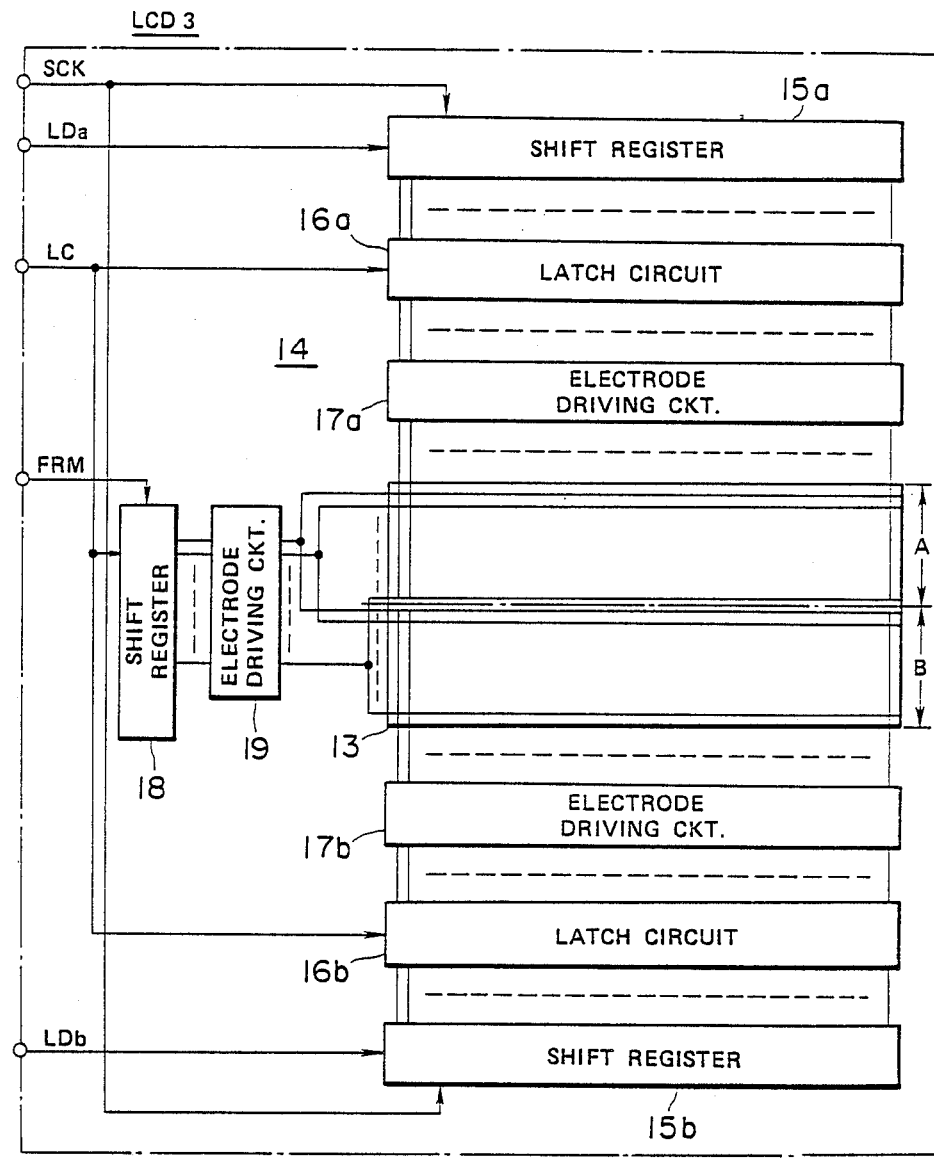
FIG. 5 is a block diagram of the liquid crystal display unit 3 of the display system of FIG. 1.

The LCD 3 will now be more fully described with reference to FIG. 5. The LCD 3 includes, as shown in FIG. 5, a liquid crystal display panel 13 and a panel driver circuit 14 provided for driving the display panel 13. The liquid crystal display panel 13 has, for example, 640 horizontal electrodes (row electrodes) and 192 vertical electrodes (column electrodes) for displaying an image composed of a 640×192 dot matrix. The liquid crystal display panel 13 is divided into two display blocks A and B of an identical construction which are independently driven. The column electrodes of the display block A are driven by a circuit comprising a 640-bit shift register 15a, a 640-bit latch circuit 16a and an electrode driving circuit 17a, while the column electrodes of the display block B are driven by another circuit comprising a 640-bit shift register 15b, a 640-bit latch circuit 16 b and an electrode driving circuit 17b. The row electrodes of the display blocks A and B are driven by a circuit comprising a 96-bit shift register 18 and an electrode driving circuit 19.

To display an image on the liquid crystal display panel 13 of the LCD 3, two sets of serial data for respectively displaying dots on the first (uppermost) rows of dots of the display blocks A and B are first supplied as display data LDa and LDb to the shift registers 15a and 15b, respectively, together with a shift clock SCK. When the display data LDa and LDb each composed of 640 bits have been stored respectively in the shift registers 15a and 15b, the display controller 1 outputs a latch clock signal LC and a frame signal FRM. When the latch clock signals LC is outputted, the data contained in the shift registers 15a and 15b are loaded respectively onto the latch circuits 16a and 16b, and when the frame signal FRM is outputted together with the latch clock signal LC, a bit data of "1" is stored into the first-bit stage of the shift register 18, whereby the dots on the 1st (uppermost) rows of the display blocks A and B are driven. The display controller 1 then outputs the data LDa and LDb for displaying dots on the 2nd rows of the display blocks A and B together with the shift clock signal SCK, and outputs the latch clock signal LC when the data LDa and LDb (each composed of 640 bits) are fully loaded onto the shift registers 15a and 15b. When the latch clock signal LC is outputted, the data contained in the shift registers 15a and 15b are stored into the latch circuits 16a and 16b, and at the same time the bit data of "1" is stored into the second bit-stage of the shift register 18, whereby the dots on the 2nd rows of the display blocks A and B are driven. And thereafter, an operation similar to the above is repeatedly carried out to display dots on the display panel 13.

[2] Structure of display controller 1

Figure 6:
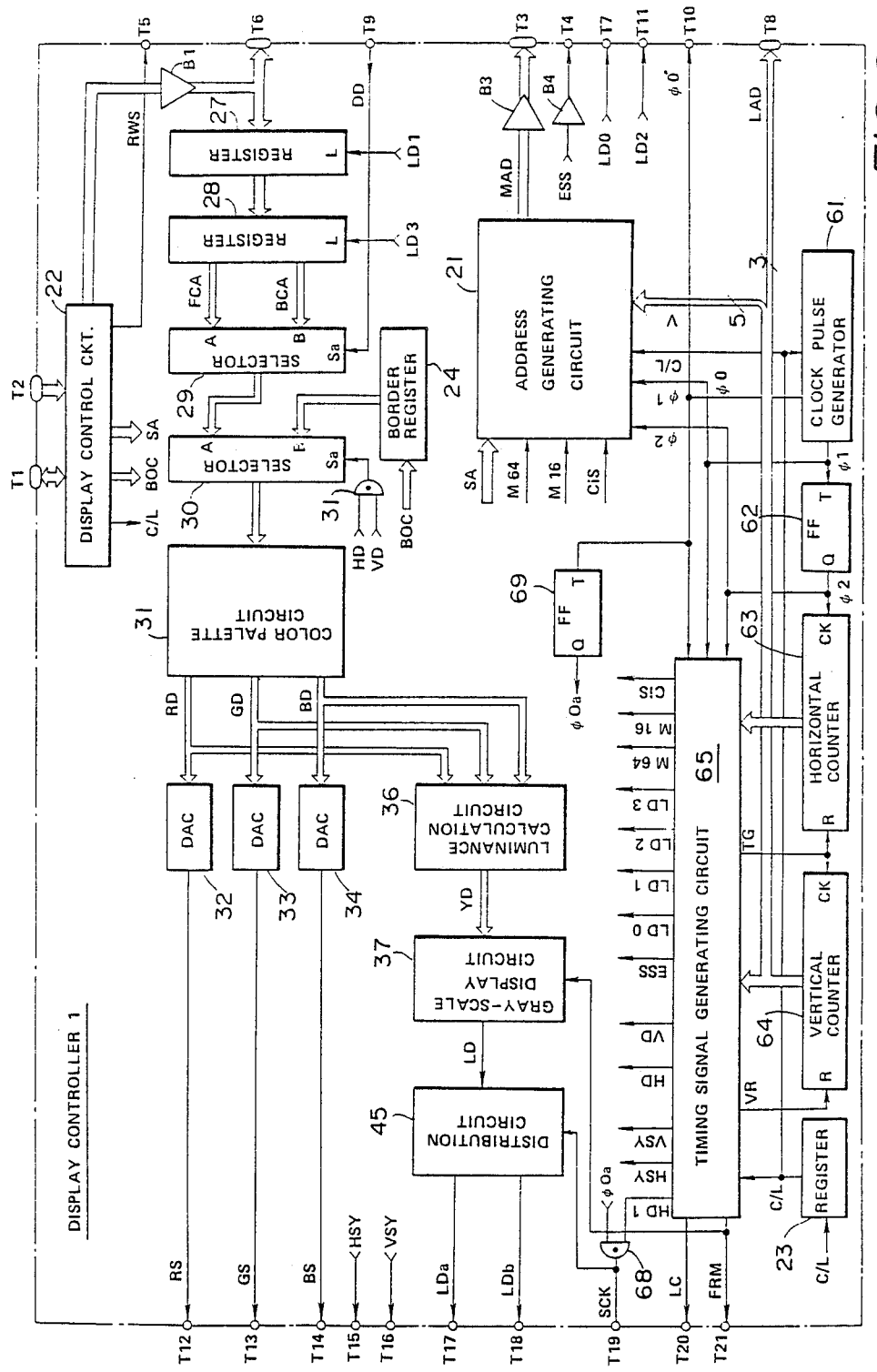
FIG. 6 is a block diagram of the display controller 1 of the display system of FIG. 1.
Figure 7:
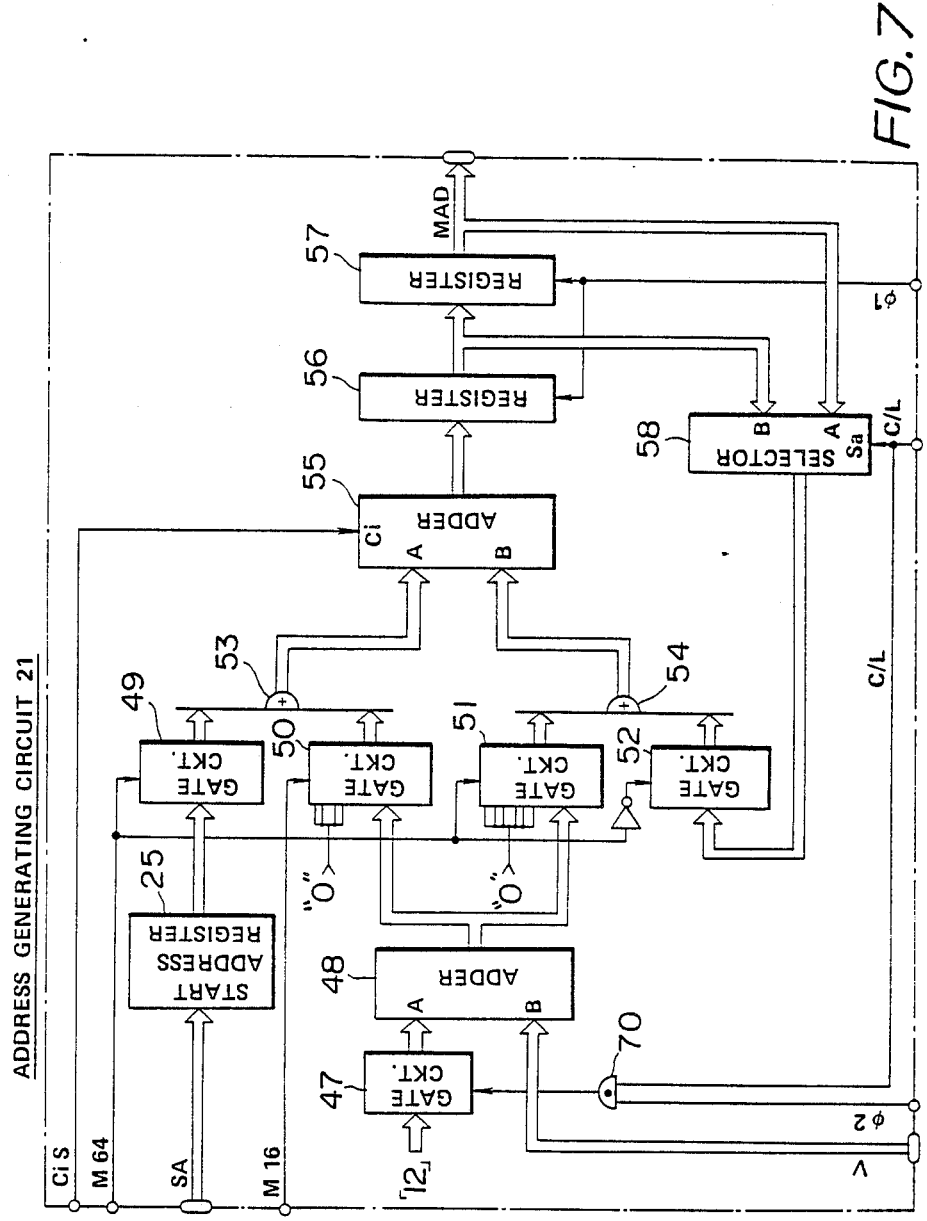
FIG. 7 is a block diagram of the address generating circuit 21 of the display controller 1 of FIG. 6.

FIG. 6 shows the structure of the display controller 1, and FIG. 7 shows the structure of an address generating circuit 21 of the display controller 1 of FIG. 6. Firstly, each circuit element of the display controller 1 of FIG. 6 will be described.

(a) Display control circuit 22

The display control circuit 22 effects a transfer of data between the CPU 5 (FIG. 1) and the display controller 1. When the CPU 5 outputs a display unit selection data C/L (one bit), a border color code BOC (4 bits) and a start address SA, the display control circuit 22 stores them respectively into a register 23, a border register 24 and a start address register 25 (FIG. 7). The display unit selection data C/L indicates the kind of a display unit to be selected, and is rendered "0" when a CRT display unit is used and is rendered "1" when an LCD is used. The border color code BOC designates a color of the border area or the peripheral marginal area of the screen where a display of image is not made. The start address SA indicates, as described above, that address of the video memory 4 where display data for the dots at the display position No. 0 of the screen is stored. When a display data is outputted from the CPU 5, the display control circuit 22 supplies the display data through a buffer amplifier B1 and a terminal T6 to the data terminal DT of the video memory 4. At this time, the display control circuit 22 enables a buffer amplifier B2 of FIG. 1, disables buffer amplifiers B3 and B4 of FIG. 6, and outputs a read/write control signal RWS (a "1" signal) to the video memory 4. As a result, the display data outputted from the CPU 5 is written into the video memory 4. The read/write control signal RWS is normally held in a "0" state. The display control circuit 22 outputs a memory write enable signal to the CPU 5 during each non-display period such as a vertical retrace line period.

(b) Registers 27 and 28

A character code CRC read out of the video memory 4 (FIG. 1) is stored into the latch circuit 7 shown in FIG. 1, whereas color codes FCA and BCA read from the video memory 4 are temporarily stored into the register 27 in response to a load signal $LD_1$ and are then stored into the register 28 in response to a load signal $LD_3$. The color codes FCA and BCA thus stored in the register 28 are supplied respectively to input terminals A and B of a selector 29. The synchronization of the signal timings can be achieved by the provision of the register 28.

(c) Selector 29

The selector 29 outputs data fed to the input terminal A when a "1" signal is supplied to a selection terminal Sa thereof, and outputs data fed to the input terminal B when a "0" signal is supplied to the selection terminal Sa. As shown, the selection terminal Sa is supplied with the data DD outputted from the P/S converter 9 of FIG. 1. And therefore, the foreground color code FCA is outputted from the selector 29 when the data DD is "1", and the background color code BCA is outputted when the data DD is "0".

(d) Selector 30

The selector 30 outputs the color code FCA or BCA fed from the selector 29 when a "1" signal is supplied from an AND gate 31 to a selection terminal Sa thereof. When the signal supplied to the selection terminal Sa is "0", the selector 30 outputs the border color code BOC fed from the border register 24. The output signal of the AND gate 31 is rendered "1" only when a display of image is effected on the screen.

(e) Color palette circuit 31

The color palette circuit 31 converts the color code outputted from the selector 30 into color data RD (red), GD (green) and BD (blue) each composed of three bits. The relationship between the color codes used and the color data RD, GD and BD is shown in Table 1.

TABLE 1

| color code | | RD | | | GD | | | BD | | |
|---|---|---|---|---|---|---|---|---|---|---|
| IRGB | color | $R_2$ | $R_1$ | $R_0$ | $G_2$ | $G_1$ | $G_0$ | $B_2$ | $B_1$ | $B_0$ |
| 0000 | Black | 0 | 0 | 0 | 0 | 0 | 0 | 0 | 0 | 0 |
| 0001 | Blue | 0 | 0 | 0 | 0 | 0 | 0 | 1 | 0 | 0 |
| 0010 | Green | 0 | 0 | 0 | 1 | 0 | 0 | 0 | 0 | 0 |
| 0011 | Cyan | 0 | 0 | 0 | 1 | 0 | 0 | 1 | 0 | 0 |
| 0100 | Red | 0 | 1 | 1 | 0 | 0 | 0 | 0 | 0 | 0 |
| 0101 | Magenta | 1 | 0 | 0 | 0 | 0 | 0 | 1 | 0 | 0 |
| 0110 | Brown | 1 | 0 | 0 | 0 | 1 | 1 | 0 | 0 | 0 |
| 0111 | White | 1 | 0 | 0 | 1 | 0 | 0 | 1 | 0 | 0 |
| 1000 | Gray | 0 | 0 | 1 | 0 | 0 | 1 | 0 | 0 | 1 |
| 1001 | Light Blue | 0 | 0 | 0 | 0 | 0 | 0 | 1 | 1 | 0 |
| 1010 | Light Green | 0 | 0 | 0 | 1 | 1 | 0 | 0 | 0 | 0 |
| 1011 | Light Cyan | 0 | 0 | 0 | 1 | 1 | 0 | 1 | 1 | 0 |
| 1100 | Light Red | 1 | 0 | 1 | 0 | 0 | 0 | 0 | 0 | 0 |
| 1101 | Light Magenta | 1 | 1 | 0 | 0 | 0 | 0 | 1 | 1 | 0 |
| 1110 | Yellow | 1 | 1 | 0 | 1 | 0 | 0 | 0 | 0 | 0 |
| 1111 | White (High Intensity) | 1 | 1 | 1 | 1 | 1 | 1 | 1 | 1 | 1 |

(f) DACS 32 to 34

The DACS (Digital-to-Analog Converters) 32 to 34 convert the color data RD, GD and BD into corresponding analog signals, respectively. Analog signals outputted from the DACs 32 to 34 are supplied to the CRT display unit 2 of FIG. 1 as the color signals RS, GS and BS, respectively.

(g) Luminance calculation circuit 36

The luminance calculation circuit 36 produces a luminance or an intensity data YD (3 bits) by effecting the following arithmetic operation on the color data RD, GD and BD:

$$\begin{array}{r} R_2\ R_1\ R_0 \\ R_2 \\ B_2\ B_1 \\ +)\ G_2\ G_1\ G_0\ G_2 \\ \hline Y_4\ Y_3\ Y_2\ Y_1\ Y_0 \end{array}$$

Wherein $R_0$, $R_1$ and $R_2$ are the first, second and third bits of the color data RD, respectively, and this is true with $G_0$ to $G_2$ and $B_0$ to $B_2$. Only the second to fourth bits $Y_1$ to $Y_3$ of the calculation result are outputted as the luminance data YD. The aforesaid arithmetic operation bases on the following well-known equation for converting analog RGB signals into a luminance signal:

$$Y=0.3R+0.59G+0.11B$$

(h) Gradation display circuit 37

The gray-scale display circuit 37 is provided for achieving a gray-scale display on the liquid crystal display panel 13 of the LCD 3 in accordance with the luminance data YD. The basic principle of the gray-scale display effected in this embodiment will now be described.

Figure 8:
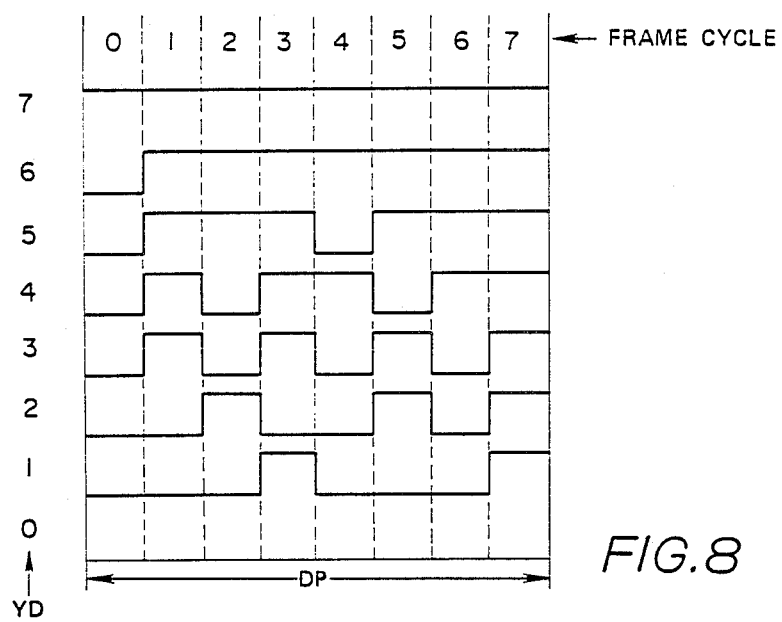
FIG. 8 is a timing chart showing the operation of the gray-scale display circuit 37 of the display controller 1 of FIG. 6.
Figure 9:
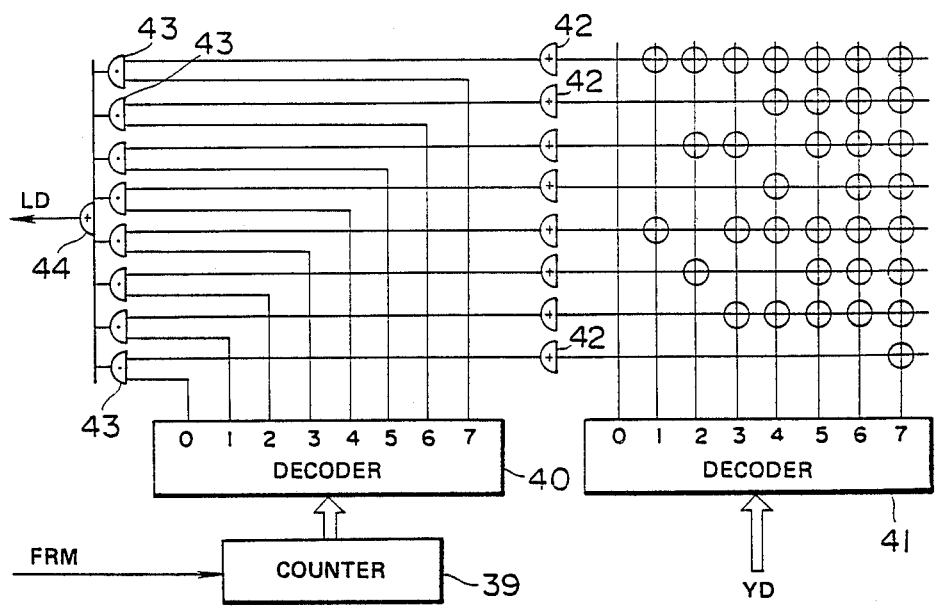
FIG. 9 is a block diagram of one example of the gray-scale display circuit 37 of the display controller 1 of FIG. 6.

In this embodiment, display of an image is performed on a frame basis, and eight consecutive frames constitute one display period. When the luminance data YD for a given dot (dot X) on the panel 13 is "7" (black), the dot X is displayed in each of the eight frame cycles within a display period, that is to say, eight times per display period. When the luminance data YD of the dot X is "0" (white), the dot X is not displayed in any one of the eight frame cycles within a display period. On the other hand, when the luminance data YD of the dot X is any one of "1" to "6", the dot X is displayed the number of times determined by the luminance data YD within each display period. For example, when the luminance data YD is "6", the dot X is displayed seven times within one display period, and when the luminance data YD is "5", the dot is displayed six times. Thus, in this embodiment, the gray-scale display is achieved based on the number of times of display of each dot within a display period. The wording "display a dot" actually means that the dot on the panel 13 is activated by a voltage, that is to say, data representative of "1" for activating the dot is loaded onto the shift register 15a or 15b shown in FIG. 5. FIG. 8 shows one example of the relationship between each luminance data YD and a display timing of the corresponding dot. It will be appreciated from FIG. 8 that when the luminance data YD for a dot to be displayed is "7", the dot is displayed in the first through eighth frame cycles within each display period. And when the luminance data YD is "4", the dot is displayed in the second, fourth, fifth, seventh and eighth frame cycles within each display period. FIG. 9 shows the construction of one example of the gray-scale display circuit 37 which outputs serial display data LD in accordance with the luminance data YD and the display timings shown in FIG. 8. As shown in FIG. 9, the gray-scale display circuit 37 comprises a counter 39 of a three-bit type which counts up the frame signal FRM. The frame signal FRM is outputted once at the beginning of each frame scanning, and therefore the output of this counter 39 indicates the number of the current frame cycle which is one of the frame cycles No. 0 to No. 7 shown in FIG. 8. The gray-scale display circuit 37 further comprises a decoder 40 for decoding the output of the counter 39, a decoder 41 for decoding the luminance data YD, eight OR gates 42, eight AND gates 43 and an OR gate 44. Each of the OR gates 42 effects a logical OR operation on signals applied to nodes (circles) of the input line thereof. And, the output signal of the OR gate 44 is supplied as the display data LD to a distribution circuit 45 of FIG. 6.

(i) Distribution circuit 45

The distribution circuit 45 outputs those bits of the display data LD used for displaying dots on the display block A as display data LDa, and outputs the remaining bits of the display data LD used for displaying dots on the display block B as display data LDb. More specifically, as the gray-scale display circuit 37 alternately outputs eight-bit serial display data for the display block A and eight-bit serial display data for the display block B, the distribution circuit 45 latches the serial display data LD on a sixteen-bit unit basis, and serially outputs the half (eight bits) of the latched data for the display block A as the display data LDa and the other half (eight bits) for the display block B as the display data LDb in synchronization with the shift clock pulse SCK.

(j) Address generating circuit 21

The address generating circuit 21 generates address data MAD for accessing the video memory 4 to read data therefrom. This address generating circuit 21 comprises, as shown in FIG. 7, a gate circuit 47, an adder 48, the start address register 25, and gate circuits 49 to 52. Each of the gate circuits 50 and 51 is additionally provided with a function to establish a multiplication. More specifically, the lower four bits of input terminals of the gate circuit 50 are supplied with "0" signals and an output of the adder 48 is supplied to the remaining upper bits of the input terminals of the gate circuit 50. And therefore, when the gate circuit 50 is opened, the output of the adder 48 is shifted four bits by this gate circuit 50 and is outputted therefrom. Thus, when opened, the gate circuit 50 outputs data sixteen times as large as the output data of the adder 48. Similarly, the lower six bits of input terminals of the gate circuit 51 are supplied with "0" signals, and therefore, when opened, the gate circuit 51 outputs data sixty four times as large as the output data of the adder 48. The address generating circuit 21 further comprises an OR circuit 53 for effecting a logical OR operation on each pair of bits of the output data of the gate circuits 49 and 50, an OR circuit 54 for effecting a logical OR operation on each pair of bits of the output data of the gate circuits 51 and 52, an adder 55, registers 56 and 57 each of which stores and outputs its input data at the trailing edge of a clock pulse $\phi_1$, and a selector 58. This address generating circuit 21 will be more fully described later.

(k) Clock pulse generator 61, Flip-flop 62, Horizontal counter 63, and Vertical counter 64.

The clock pulse generator 61 shown in FIG. 6 generates a master clock pulse $\phi_0$ and the clock pulse $\phi_1$ (see FIG. 10-(b)) produced by dividing the master clock pulse $\phi_0$ by eight. The flip-flop (hereinafter referred to as "FF") 62 divides the clock pulse $\phi_1$ by two to produce a clock pulse $\phi_2$ shown in FIG. 10-(c). The horizontal counter 63 counts up the clock pulse $\phi_2$ to form a count output indicative of the horizontal scanning position when the CRT display unit 2 is connected, the count output being indicative of the bit positions of the shift registers 15a and 15b (FIG. 5) into which data are to be stored when the LCD 3 is connected. The vertical counter 64 counts up a signal TG outputted from the timing signal generating circuit 65 to form a count output indicative of the vertical scanning position on the screen. The count output of the vertical counter 64 is supplied to the timing signal generating circuit 65. Also, the upper five bits of the count output of the vertical counter 64 are supplied to input terminal B of the adder 48 shown in FIG. 7, while the lower three bits thereof are supplied as the address data LAD to the character generator 8 shown in FIG. 1.

(l) Timing signal generating circuit 65

The timing signal generating circuit 65 generates, in accordance with the clock pulses $\phi_0$ to $\phi_2$ and the count outputs of the horizontal and vertical counters 63 and 64, a horizontal synchronization signal HSY and a vertical synchronization signal VSY both to be supplied to the CRT display unit 2. The timing signal generating circuit 65 also generates the shift clock signal SCK, the latch clock signal LC and the frame signal FRM all to be supplied to the LCD 3, and further generates other various timing signals.

[3] Operation of the display system

Figure 12:
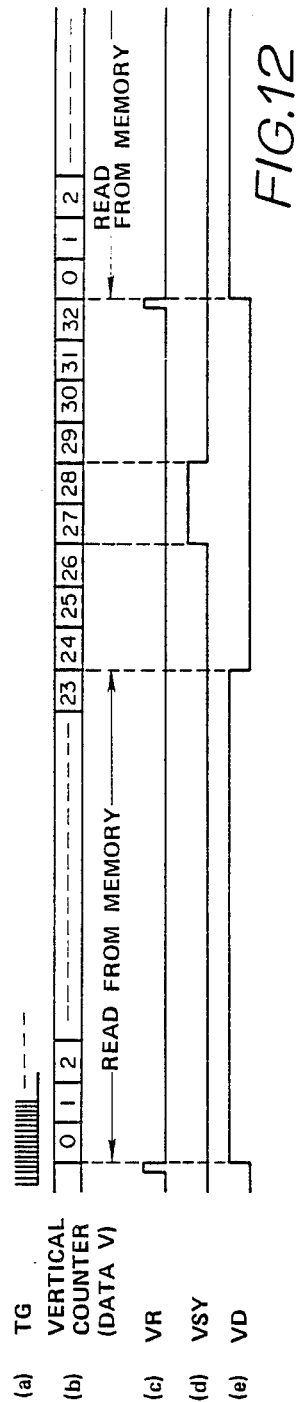

Prior to beginning a display of characters, the CPU 5 outputs the display unit selection data C/L, the border color code BOC and the data representative of the start address SA. These data are stored into the register 23, the border register 24 and the start address register 25, respectively. The CPU 5 then stores display data into the video memory 4. And, the display of characters on the screen is performed based on the data in the registers 23 to 25 and the video memory 4 in the following manner: [3-1]In the case of the CRT display unit 2 being connected (a) Basic timings When the display unit selection data C/L is "0", the clock pulse generator 61 shown in FIG. 6 generates the master clock pulse $\phi_0$ of 14.3 MHz and the clock pulse $\phi_1$ obtained by dividing the master clock pulse $\phi_0$ by eight. The clock pulse $\phi_1$ is further divided by two by the FF 62 to form the clock pulse $\phi_2$. The waveforms of these clock pulses $\phi_0$ to $\phi_2$ are shown in FIG. 10. The horizontal counter 63 is triggered at each trailing edge of the clock pulse $\phi_2$, so that the count output of the horizontal counter 63 is changed as shown in FIG. 11-(b) in response to the clock signal $\phi_2$ shown in FIG. 11-(a). The timing signal generating circuit 65 generates the signal TG shown in FIG. 11-(c) when the count output of the horizontal counter 63 becomes "56", and supplies the generated signal TG to a reset terminal R of the horizontal counter 63 and to a clock terminal CK of the vertical counter 64. At the trailing edge of this signal TG, the horizontal counter 63 is reset and the vertical counter 64 is triggered. And therefore, the count output of the vertical counter 64 varies as shown in FIG. 11-(d). The numeral on the left-hand side of each hyphen shown in FIG. 11-(d) indicates the upper five bits of the count output of the vertical counter 64, and the numeral on the right-hand side of each hyphen indicates the lower three bits thereof. The signal TG shown in FIG. 11-(c) is again illustrated in FIG. 12-(a), and in response to this signal TG, the count output of the vertical counter 64 is changed as shown in FIG. 12-(b), wherein only the upper five bits of the count output are shown. When the upper five bits of the count output of the vertical counter 64 represent "32", the timing signal generating circuit 65 outputs a reset signal VR shown in FIG. 12-(c). The vertical counter 64 is reset at the trailing edge of the reset signal VR.

The clock pulses $\phi_0$ to $\phi_2$ and the count outputs of the horizontal and vertical counters 63 and 64 described above determine the basic timings of various timing signals used in this system. The timing signal generating circuit 65 thus generates the various timing signals in accordance with the clock pulses $\phi_0$ to $\phi_2$ and the count outputs of the horizontal and vertical counters 63 and 64.

(b) Operation of the address generating circuit 21

Referring now to FIG. 7, when the display unit selection data C/L is "0", the output of the AND gate 70 is rendered "0", so that the gate circuit 47 is closed to cause data representative of "0" to be supplied to the input terminal A of the adder 48. As a result, the adder 48 outputs the data fed to its input terminal B, that is, the upper five bits of the count output of the vertical counter 64 (the data constituted by these five bits will be hereinafter referred to as "data V"). Also, when the display unit selection data C/L is "0", the selector 58 supplies the gate circuit 52 with the data fed to the input terminal B thereof, that is, the output data of the register 56.

Figure 13:
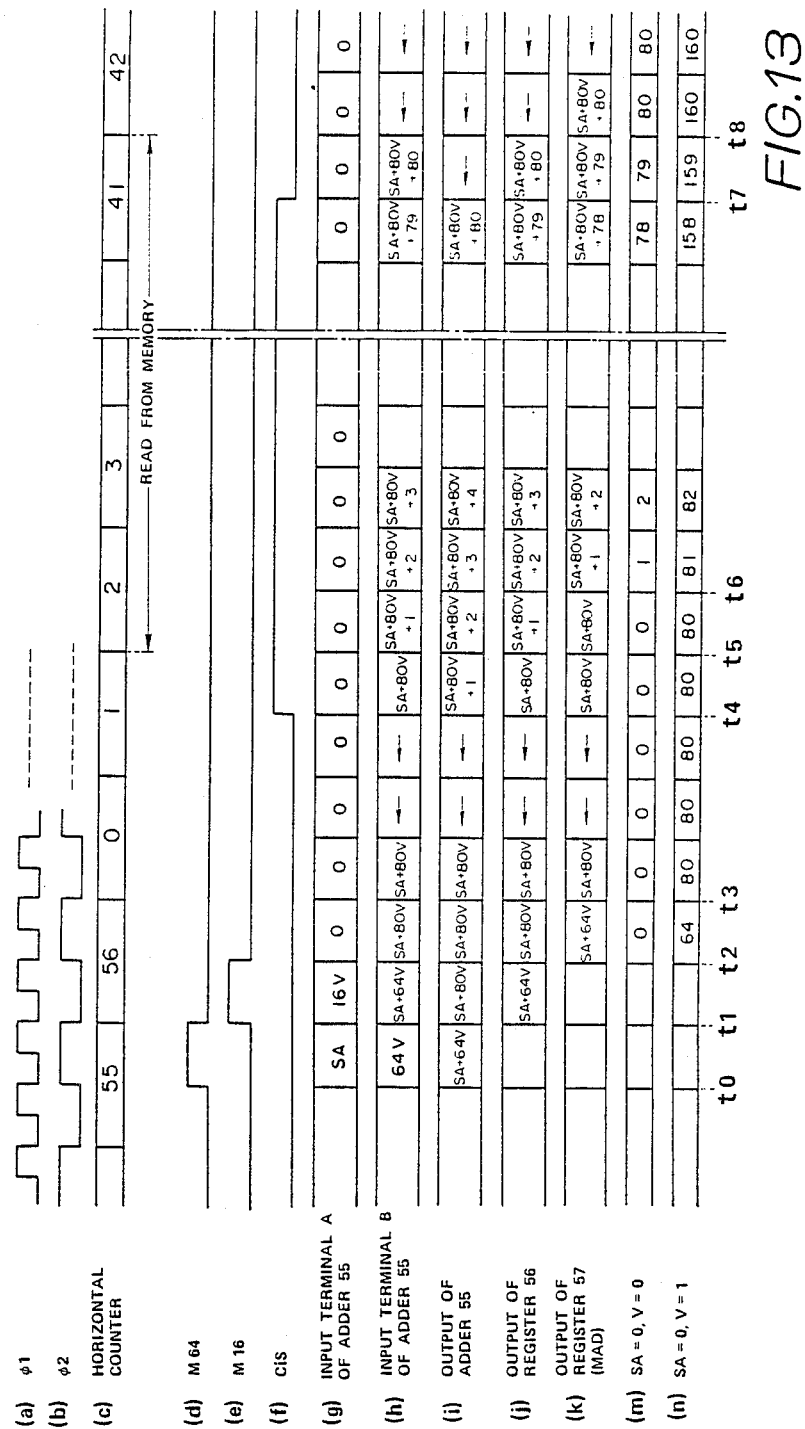

The clock pulses $\phi_1$ and $\phi_2$ and the count output of the horizontal counter 63 are again illustrated in FIGS. 13-(a) to 13-(c). Shown in FIGS. 13-(d) and 13-(e) are waveforms of signals M64 and M16 outputted from the timing signal generating circuit 65. When the signal M64 of "1" is outputted from the timing signal generating circuit 65, the gate circuits 49 and 51 are opened, and when the signal M16 of "1" is outputted, the gate circuit 50 is opened. On the other hand, the gate circuit 52 is opened when the signal M64 is rendered "0". Shown in FIG. 13-(f) is the waveform of a signal CiS which is supplied to a carry input terminal Ci of the adder 55 of FIG. 7.

When the signal M64 is rendered "1" at time $t_0$ shown in FIG. 13, the gate circuit 49 is opened, so that the data representing the start address SA and contained in the start address register 25 is supplied through the gate circuit 49 to one input terminals of the OR circuit 53. This start address=M×N where M is a row number and N is a column number. At this time, the gate circuit 50 is closed, so that the other input terminals of the OR circuit 53 are supplied with data representative of "0". As a result, the OR circuit 53 outputs the data representing the start address SA to the input terminal A of the adder 55 (see FIG. 13-(g)). Also, when the signal M64 is rendered "1" at the time $t_0$, the gate circuit 51 is opened, so that it outputs data sixty four times as large as the data V (i. e., Q [row number]×64=. 64V) to one input terminals of the OR circuit 54. At this time, the gate circuit 52 is closed, so that the data 64V is supplied to the input terminal B of the adder 55 (see FIG. 13-(h)). Consequently, the data outputted from the adder 55 at the time $t_0$ becomes equal to "SA+64V" (FIG. 13-(i)).

At time $t_1$, the data "SA+64V" outputted from the adder 55 is stored into the register 56 and thence supplied through the selector 58 to the input terminal of the gate circuit 52. At this time, the signal M64 falls and the signal M16 rises. As a result, at this time $t_1$ data "16V" outputted from the gate circuit 50 is supplied through the OR circuit 53 to the input terminal A of the adder 55 (see FIG. 13-(g)), while the data "SA+64V" outputted from the gate circuit 52, that is, the output of the register 56, is supplied through the OR circuit 54 to the input terminal B of the adder 55 (FIG. 13 (h)). Consequently, data "SA+80V" is outputted from the adder 55 (FIG. 13-(i)). At time $t_2$, the data "SA+80V" outputted from the adder 50 and the data "SA+64V" outputted from the register 56 are stored respectively into the registers 56 and 57, and these data are outputted therefrom (FIGS. 13-(j) and 13-(k)). At this time, both of the signals M64 and M16 are rendered "0" to close the gate circuits 49 to 51 and to open the gate circuit 52. As a result, data representative of "0" and the data "SA+80V" outputted from the register 56 are supplied to the input terminals A and B of the adder 55, so that the adder 55 continues to output the data "SA+80V". At time $t_3$, data at the input and output terminals of the adder 55 and the output data of the registers 56 and 57 become as shown in FIGS. 13-(g) to 13-(k), and thereafter these data remain unchanged until the signal CiS is rendered "1" at time $t_4$. Thus, during the time period from the time $t_3$ to the time $t_4$, the data "SA+80V" is outputted as the address data MAD (FIG. 13-(k)), and supplied through the buffer amplifier B3 and the terminal T3 (FIG. 6) to the address terminal AD of the video memory 4 shown in FIG. 1. Each arrow in FIG. 13 indicates that the data is the same as the next data on the left side.

At time $t_4$, data "SA+80V" are stored respectively into the registers 56 and 57, and these data are outputted therefrom. At this time, both of the signals M64 and M16 are "0", so that data representative of "0" and the data "SA+80V" are supplied respectively to the input terminals A and B of the adder 55. At this time $t_4$, the signal CiS is rendered "1", and therefore, the adder 55 outputs data representative of "SA+80V+1". At the next time $t_5$, the output data of the adder 55, register 56 and register 57 become equal to "SA+80V+2", "SA+80V+1" and "SA+80V", respectively (see FIGS. 13-(i), 13-(j) and 13-(k)). And, at time $t_6$, the output data of the adder 55, register 56 and register 57 become equal to "SA+80V+3", "SA+80V+2" and "SA+80V+1", respectively. And thereafter, an operation similar to the above is repeatedly carried out.

Once the signal CiS is rendered "0" at time $t_7$ which comes in the middle of the period when the count output of the horizontal counter 63 is "41", the output data of the adder 55 which now represents "SA+80V+80" is thereafter kept unchanged, and the outputs of the registers 56 and 57 become as shown in FIGS. 13-(j) and 13-(k). When the count output of the horizontal counter 63 again becomes equal to "55", the signal M64 is again outputted, whereby an operation similar to the above is repeated.

As will be appreciated from FIG. 13-(k), during the time when the count output of the horizontal counter 63 varies from "2" to "41", the address data MAD is changed from "SA+80V" to "SA+80V+79". For example, if both of the data SA and V are "0", the address data MAD is changed from "0" to "79" as shown in FIG. 13-(m), and if the data SA is "0" but the data V is "1", the address data MAD is changed from "80" to "159" as shown in FIG. 13-(n). It should be noted that the address data MAD thus produced is effective only when the count output of the horizontal counter 63 is within the range of from "2" to "41". When the count output of the horizontal counter 63 is not within the above range, data read from the video memory 4 by the address data MAD are not used for the actual display operation.

As will be seen from FIGS. 12-(a) and 12-(b), when the upper five bits of the count output of the vertical counter 64 (that is, the data V) is "0", the signal TG is outputted eight times. On the other hand, the cycle of the signal TG is equal to that of the count operation of the horizontal counter 63. And therefore, if the start address SA is "0", the address data MAD is changed from "0" to "79" eight times while the data V is "0". And, data are read from the video memory 4 by these address data MAD to effect a display of characters on the first row (the uppermost row) shown in FIG. 4 as will be more fully described later. When the data V is "1", the address data MAD is changed from "80" to "159" eight times to read from the video memory 4 data for displaying characters on the second row, and, when the data V is "23" a display of characters is effected on the lowermost row. On the other hand, a non-display period including the vertical retrace time is provided when the data V is within the range of from "24" to "32". The reason why the same address data MAD is outputted eight times is that each character is constituted by eight rows of dots.

(c) Character display operation

Figure 14:
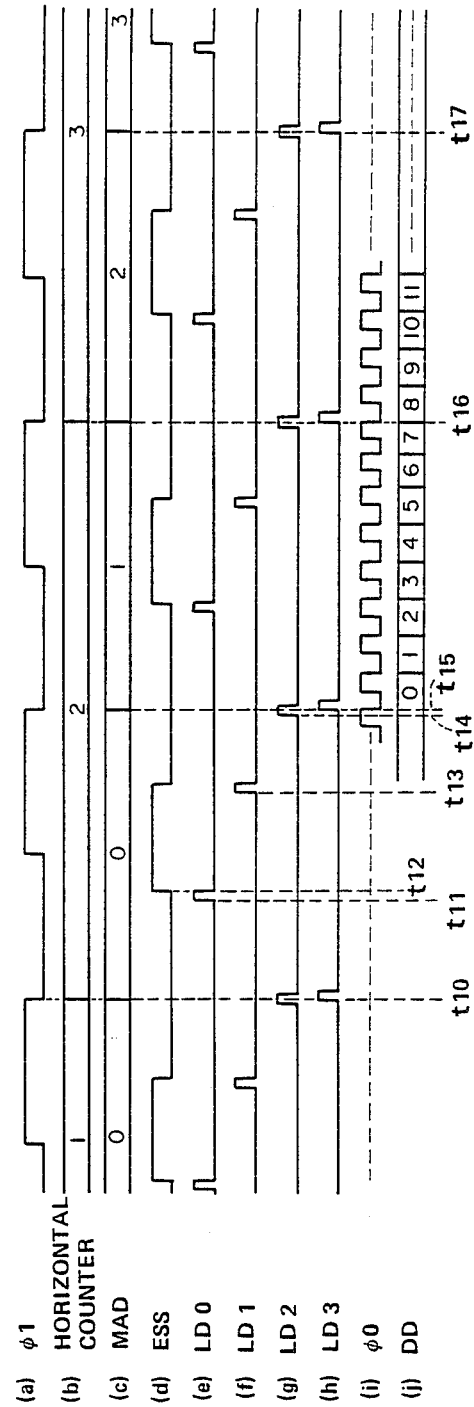

FIGS. 14-(a) to 14-(c) show the clock pulse $\phi_1$, the count output of the horizontal counter 63 and the address data MAD, wherein it is assumed that the start address SA is "0". It is also assumed that within the time range of FIG. 14 the count output of the vertical counter 64 is "0 - 0", that is to say, both of the upper five bits and lower three bits of the count output of the vertical counter 64 are "0". And therefore, time $t_{10}$ shown in FIG. 14 is equal to the time $t_{10}$ shown in FIG. 11. Shown in FIG. 14-(d) is the waveform of the signal ESS outputted from the timing signal generating circuit 65 to the terminal CS of the video memory 4 shown in FIG. 1, FIG. 14-(e) the waveform of the load signal $LD_0$ supplied to the load terminal L of the latch circuit 7 (FIG. 1), FIG. 14-(f) the waveform of the load signal $LD_1$ supplied to the load terminal L of the register 27 (FIG. 6), FIG. 14-(g) the waveform of the load signal $LD_2$ supplied to the load terminal L of the P/S converter ) (FIG. 1), FIG. 14-(h) the waveform of the load signal $LD_3$ supplied to the load terminal L of the register 28 (FIG. 6), and FIG. 14-(i) the waveform of the clock pulse $\phi_0$ (FIG. 10-(a)) supplied to the clock terminal CK of the P/S converter 9.

When the address data MAD and the signal ESS in the "0" state are outputted to the memory 4 at the time $t_{10}$ shown in FIG. 14, the character code CRC is read from the address "0" in the area $E_0$ of the memory 4, this character code being hereinafter referred to as "CRC-0". When the load signal $LD_0$ is outputted to the latch circuit 7 at the next time $t_{11}$, the character code CRC-0 is stored into the latch circuit 7 and thence outputted to the address terminal $AD_1$ of the character generator 8. At this time, the address terminal $AD_0$ of the character generator 8 is supplied with the address data LAD (the lower three bits of the count output of the vertical counter 64) representative of "0". And therefore, when the character code CRC-0 is supplied to the character generator 8, an eight-bit dot pattern of the first row of the character pattern designated by the character code CRC-0 is read from the character generator 8 and supplied to the P/S converter 9. At time $t_{12}$, the signal ESS is rendered "1", so that the color codes FCA and BCA are read from the address "0" of the area $E_1$ of the video memory 4. When the load signal $LD_1$ is outputted to the register 27 shown in FIG. 6 at time $t_{13}$, the color codes FCA and BCA read from the memory 4 are stored into the register 27. At the next time $t_{14}$, the load signal $LD_2$ is supplied to the P/S converter 9, so that the dot pattern read from the character generator 8 is stored into the P/S converter 9. And, when the load signal $LD_3$ is supplied to the load terminal L of the register 28 at time $t_{15}$, the color codes FCA and BCA in the register 27 are stored into the register 28. The dot pattern stored in the P/S converter 9 is then serially outputted as the data DD in accordance with the clock pulse $\phi_0$ and supplied to the selection terminal Sa of the selector 29 (FIG. 6) as shown in FIG. 14-(j). Thus, when the data DD is "1" the selector 29 outputs the foreground color code FCA to the selector 30, and when the data DD is "0" the selector 29 outputs the background color code BCA to the selector 30. At this time, the selection terminal Sa of the selector 30 is supplied with a "1" signal as will be described later. And therefore, the color code FCA or BCA thus outputted from the selector 29 is supplied through the selector 30 to the color palette circuit 31 to be converted into the color data RD, GD and BD. The color data RD, GD and BD thus obtained are then converted respectively into the analog color signals RS, GS and BS by the DACs 32 to 34 and supplied to the CRT display unit 2. On the other hand, the timing signal generating circuit 65 supplies the CRT display unit 2 with the horizontal synchronization signal HSY shown in FIG. 11-(e) and the vertical synchronization signal VSY shown in FIG. 12-(d). And therefore, when the color signals RS, GS and BS are supplied to the CRT display unit 2, the eight dots on the first row of the dot-matrix at the display position No. 0 shown in FIG. 4 are displayed in colors determined by the color signals RS, GS and BS. Thus, when the P/S converter 9 (FIG. 1) outputs the data DD of eight bits during the time period between the time $t_{15}$ and the time $t_{16}$, a color display of dots is made on the first row of the dot-matrix at the display position No. 0.

On the other hand, during the time period between the time $t_{15}$ and the time $t_{16}$, the address data MAD is rendered "1" and in addition the signals ESS and $LD_0$ to $LD_3$ are outputted in accordance with the same timings as those signals outputted during the time period between the time $t_{10}$ and the time $t_{15}$. As a result, the first row portion (dot pattern) of the character pattern designated by the character code CRC-1 in the address "1" of the area $E_0$ of the memory 4 is loaded onto the P/S converter 9 at the time $t_{16}$. Also, the color codes FCA and BCA in the address "1" of the area $E_1$ of the memory 4 are stored into the register 28. And, when the dot pattern in the P/S converter 9 is serially outputted as the data DD during the period between the time $t_{16}$ and the time $t_{17}$, display of dots is made on the first row of the dotmatrix at the display position No. 1. And thereafter, a display operation similar to the above is repeatedly carried out. FIG. 11-(f) shows the address data MAD varying in accordance with the above operation, and FIG. 11-(g) shows the positions of the dots and their display timings.

When all of the dots on the first rows of the dotmatrices of the display position Nos. 0 to 79 have been displayed, the count output of the vertical counter 64 is changed to "0 - 1" (see FIG. 11-(d) at time $t_{20}$), so that data representative of "1" is supplied as the address data LAD to the address terminal $AD_0$ of the character generator 8. And, during the time when the count output of the horizontal counter 63 varies from "2" to "41", the dots on the second rows of the dot-matrices of the display position Nos. 0 to 79 are displayed (see FIG. 11-(g)). Thus, when the upper five bits of the count output of the vertical counter 64 is "0", the dots on the first to eighth rows of the dot-matrices of the display position Nos. 0 to 79 are sequentially displayed. In the similar manner, when the upper five bits of the count output of the vertical counter 64 is "1", display of the dots of the dot-matrices of the display position Nos. 80 to 159 is made, ... and when the upper five bits of the count output of the vertical counter 64 is "23", display of the dots of the dot-matrices of the display position Nos. 1840 to 1919 is made.

The waveforms of the signals HD and VD both generated by the timing signal generating circuit 65 are shown in FIG. 11(h) and in FIG. 12-(e), respectively. As will be appreciated from FIGS. 11 and 12, these signals HD and VD should be rendered "1" when the selector 29 shown in FIG. 6 outputs color codes to display dots on the screen. And therefore, the output of the AND gate 31 fed to the selection terminal Sa of the selector 30 (FIG. 6) is rendered "1" during the time when the display of dots are actually performed, and is rendered "0" during other periods. Thus, during the non-display periods, the selector 30 outputs the border color code BOC contained in the border register 24. And, the border area surrounding the 640×192 display positions is displayed in accordance with this border color code BOC. [3-2] In the case where the LCD 3 is connected (a) Basic timings The waveforms of the clock pulses $\phi_0$ to $\phi_2$ in this case are the same as those shown in FIG. 10, but the period of the clock pulse $\phi_0$ is now 10.7 MHz. The waveforms of the clock pulse $\phi_2$ in this case is shown in FIG. 15-(a), the variation of the count output of the horizontal counter 63 in FIG. 15(b), the waveform of the signal TG in FIG. 15-(c), and the variation of the count output of the vertical counter 64 in FIG. 15-(d). Shown in FIGS. 15-(e) and 15-(f) are the waveforms of the latch clock signal LC and the frame signal FRM, respectively. As shown, the latch clock signal LC is outputted each time the count output of the horizontal counter 63 becomes equal to "85", while the frame signal FRM is outputted when the count output of the horizontal counter 63 is equal to "85" and when the count output of the vertical counter 64 is equal to "0 - 0". Thus, the frame signal FRM is outputted once per vertical scanning. The latch clock LC and the frame signal FRM thus outputted are supplied to the LCD 3. FIGS. 15-(g) and 15-(h) show the waveforms of the signals HD and $HD_1$ outputted from the timing signal generating circuit 65, the signal $HD_1$ being supplied to one input terminal of the AND gate 68 (FIG. 6). A flip-flop 69 divides the clock pulse $\phi_0$ by two to produce a clock pulse $\phi_{0a}$ which is supplied to the other input terminal of the AND gate 68. When the signal $HD_1$ is in the "1" state, this clock pulse $\phi_{0a}$ passes through the AND gate 68 and is thence supplied as the shift clock signal SCK to the LCD 3 and the distribution circuit 45 (see FIG. 19). FIG. 16-(a) shows the signal TC, FIG. 16-(b) the variation of the upper five bits of the count output of the vertical counter 64, FIG. 16-(c) the reset signal VR to the vertical counter 64, and FIG. 16-(d) the signal VD. (b) Operation of the address generating circuit 21

When the LCD 3 is connected, data representative of "1" is stored in the register 23 (FIG. 6) as the display unit selection data C/L. When the display unit selection data C/L is rendered "1", the AND gate 70 shown in FIG. 7 is enabled to open, so that the clock pulse $\phi_2$ is supplied to the gate circuit 47. As a result, when the clock pulse $\phi_2$ is in the "0" state, data representative of "0" is supplied to the input terminal A of the adder 48, whereas data representative of "12" is supplied to the input terminal A when the clock pulse $\phi_2$ is in the "1" state. The data representative of "12" corresponds to the number of rows of the character display positions in the display block A (see FIGS. 4 and 5). When the display unit selection data C/L is "1", the output data of the register 57 is supplied through the selector 58 to the gate circuit 52.

FIG. 17 corresponds to FIG. 13 and shows the timings of the signals generated when the LCD 3 is connected. The signals M64, M16 and CiS generated when the LCD 3 is connected are different in timing from those generated when the CRT 2 is connected. Also, the data supplied respectively to the input terminal A of the adder 48 and the input terminal of the gate circuit 52 when the CRT 2 is connected are different from those supplied when the LCD 3 is connected. However, each circuit element shown in FIG. 7 performs the same operation in both cases. And, in the case where the LCD 3 is connected, the address data MAD varies as shown in FIG. 17-(k). More specifically, if both of the start address SA and the data V (the upper five bits of the count output of the vertical counter 64) are "0", as shown in FIG. 17-(m), data representative of "0" and "80×12" (or "960") are sequentially outputted when the count output of the horizontal counter 63 is "4", data representative of "1" and "80×1+1" (or "961") are sequentially outputted when the count output is "5", ... and data representative of "79" and "80×12+79" (or "1039") when the count output is "83". The data representative of "0", "1", "2", ... "79" designate those addresses of the video memory 4 in which the character codes CRC of the characters to be displayed on the first row of display positions in the display block A are stored. On the other hand, the data representative of "960", "961", ... "1039" designate those addresses of the video memory 4 in which the character codes CRC of the characters to be displayed on the first row of display positions in the display block B are stored. Similarly, when the start address SA is "0" but the data V is "1", as shown in FIG. 17-(n), data indicative of the addresses storing the character codes CRC of the characters to be displayed on the second rows of display positions in the display blocks A and B are alternately outputted during the time when the count output of the horizontal counter 63 varies from "4" to "83". The similar operation is performed when the data V takes any one of "2" to "11".

Thus, as shown in FIG. 17, data indicative of the addresses storing character codes of the characters to be displayed in the display blocks A and B are outputted in a time sharing manner.

(c) Display of characters

FIG. 18 is a timing chart corresponding to that shown in FIG. 14, wherein it is assumed that the count output of the vertical counter 64 is "0 - 0". During the period between the time $t_{30}$ and the time $t_{31}$ in FIG. 18, the character code CRC-0 and the color codes FCA and BCA are read respectively from the address "0" of the area $E_0$ and the address "0" of the area $E_1$ of the video memory 4. The read color codes FCA and BCA are stored into the register 28 shown in FIG. 6, and the dot pattern of the first row of dots of the character pattern designated by the read character code CRC-0 is stored into the P/S converter 9. During the period between the time $t_{31}$ and the time $t_{32}$, the dot pattern in the P/S converter 9 is serially supplied as data DD to the selector 29, so that the color codes FCA and BCA in the register 28 are selectively outputted therefrom. Each of the thus outputted color codes is converted into color data RD, GD and BD by the color palette circuit 31. The luminance calculation circuit 36 converts the color data RD, GD and BD into luminance data YD which is then converted into display data LD to be supplied to the distribution circuit 45.

On the other hand, during the period between the time $t_{31}$ and the time $t_{32}$, the character code CRC and the color codes FCA and BCA are read respectively from the addresses "960" of the areas $E_0$ and $E_1$ of the video memory 4. And, these read character and color codes are loaded onto the P/S converter 9 and the register 28. Then, during the period between the time $t_{32}$ and the time $t_{33}$, the data in the P/S converter 9 is serially outputted as the data DD to the selector 29. Consequently, the color codes FCA and BCA are selectively outputted from the selector 29 and converted into the display data LD which is then fed to the distribution circuit 45. And thereafter, an operation similar to the above is repeated.

The distribution circuit 45 latches the data LD (FIG. 19(b)) on a sixteen-bit unit basis and outputs those bits of the latched data LD for the display block A as data LDa in accordance with the shift clock SCK, as shown in FIG. 19-(e). The distribution circuit 45 also outputs those bits of the latched data LD for the display block B as data LDb in accordance with the shift clock SCK, as shown in FIG. 19-(f). The thus outputted data LDa and LDb are shifted into the shift registers 15a and 15b, and then loaded into the latch circuits 16a and 16b by the latch clock LC, whereby display of dots is made in accordance with the loaded data LDa and LDb.

The above-described display system is so designed as to display characters, however it is apparent that the present invention can be applied to a graphic display system of a dotmap type.

What is claimed is:

1. A display controller capable of selectively driving a selected one of a first and a second display unit, the first display unit having a display screen comprised of a scanning-type screen which provides M rows of N columns of display positions thereon, the second display unit having a display screen constituted by upper and lower scanning-type screens, each of which provides P rows of Q columns of display positions thereon, the display controller being further connected to memory means having a plurality of addresses, each for storing display data relating to an image to be displayed at a respective one of the display positions of the selected display unit, said display controller comprising:

(a) display unit designating means for designating one of said first and second display units, said designation means producing a first designation signal when the first display unit is selected, and producing a second designation signal when the second display unit is selected;

(b) tiiming signal generating means, responsive to said first designation signal, for generating first synchronization signals is response to said first designation signal to be supplied to the first display unit for scanning the screen thereof, said timing signal generating means being further responsive to said second designation signal to generate second synchronization signals in response to said second designation signal, to be supplied to the second display unit for scanning the upper and lower screens thereof;

(c) address data generating means, responsive to said first designation signal, for generating a first series of address data representative of addresses of the memory means and sequentially outputting said generated address data to the memory means in accordance with the scanning of the display screen of the first display unit, said address data generating means being further responsive to said second designation signal for generating a second series of address data representative of those of the addresses of the memory means corresponding to the upper screen and a third series of address data representative of those of the addresses of the memory means corresponding to the lower screen, said address data generating means alternately outputting, responsive to said second designation signal, each of said second series of address data and each of said third series of address data to the memory means in accordance with scanning of the upper and lower screens; and (d) display signal generating means, responsive to said first designation signal for generating a first display signal to be supplied to the first display unit based on data read from the memory means in accordance with said first series of address data, said display signal generating means being further responsive to said second designation signal to generate second and third display signals to be supplied to the second display unit based on data read from the memory means in accordance with said second and third series of address data, said second and third display signals being used to display images on the upper and lower screens of said second display unit, respectively.

2. A display controller according to claim 1, wherein the first display unit is a CRT display unit and the second display unit is a liquid crystal display unit.

3. A display controller according to claim 2, wherein said address data generating means includes means for generating said third series of address data as an address data disposed (P x Q) addresses apart from respective ones of the addresses of the memory means indicated by said second series of address data, where P and Q are the number of rows and columns of the memory means, respectively.

4. A display controller according to claim 3 further comprising counter means, operable in synchronism with said synchronization signals generated by said timing signal generating means, for producing a data "V" representative of the row of the display position currently scanned on the display screen of the designated display unit, and wherein said address data generating means comprises:

calculation means, responsive to said first designation signal, for calculating a value of "N×V", said calculation means being further responsive to said second designation signal to calculate a value of "Q×V" and of "Q×V+P×Q";

first address register means, responsive to said first designation signal, for receiving a value of said "N×V" before beginning each horizontal scan of the display screen of the first display unit, said first address register means being further responsive to said second designation means for receiving a value of said "Q×V" as an initial address before beginning each horizontal scan of the display screen of the second display unit;

second address register means responsive to said second designation signal for receiving a value of said "Q×V+P×Q" as an initial address before beginning each horizontal scan of the display screen of the second display unit;

mean responsive to said first designation signal for incrementing the contents of said first address register means in accordance with the horizontal scanning of the display screen of the first display unit and outputting the contents of said first address register means as said first series of address data; and means responsive to said second designation signal for incrementing the contents of both of said first and second address register means in accordance with the horizontal scanning of the upper and lower screens of the second display unit and alternately outputting the contents of said first and second address register means as said second and third series of address data, respectively.

5. A display controller according to claim 4, wherein each of the display data stored in the memory means comprises a character code representative of a character to be displayed in the corresponding display position and a pair of color codes for respectively designating foreground and background colors of said character, and wherein said display signal generating means comprises:

character generator means responsive to each of the character codes read from the memory means for generating a bit pattern of a character represented by the corresponding character code;

selector means for selectively outputting color codes read from the memory means with said character code in accordance with said bit pattern; and first conversion means for converting each of the color codes outputted from said selector means into corresponding color component signals to be outputted as said first display signal.

6. A display controller according to claim 5, wherein said display signal generating means further comprises second conversion means responsive to said second designation signal for converting said color component signals outputted from said first conversion means into a corresponding luminance signal, and a signal distribution means for outputting those of the luminance signals corresponding to the display positions on the upper screen as said second display signal and outputting those of the luminance signals corresponding to the display positions on the lower screen as said third display signal.

* * * * *